United States Patent [19]

Chateau

[11] 4,056,980
[45] Nov. 8, 1977

[54] DEPRESSION SENSOR FOR AN ELECTRONIC IGNITION ADVANCE DEVICE FOR AN INTERNAL COMBUSTION ENGINE

[75] Inventor: Louis Chateau, Rosny-sous-Bois, France

[73] Assignee: Ducellier & Cie, Creteil Cedex, France

[21] Appl. No.: 705,879

[22] Filed: July 16, 1976

[30] Foreign Application Priority Data

July 24, 1975 France .................................. 75.23086

[51] Int. Cl.² ........................... G01L 7/08; G01L 9/02
[52] U.S. Cl. ........................... 73/398 AR; 123/117 A; 338/4; 338/42
[58] Field of Search ....... 123/117 R, 117 A, 146.5 A, 123/148 E; 73/398 AR, 406; 338/4, 42, 101, 100

[56] References Cited

U.S. PATENT DOCUMENTS

| | | | |
|---|---|---|---|
| 2,474,662 | 6/1949 | Fuller | 338/42 |
| 3,749,073 | 7/1973 | Asplund | 123/117 R |
| 3,824,974 | 7/1974 | La Flame | 338/42 |
| 3,968,778 | 7/1976 | Gambill | 123/117 R |

*Primary Examiner*—Donald O. Woodiel

[57] ABSTRACT

A depression sensor for an electronic ignition advance device for an internal combustion engine especially intended for use in a motor vehicle, the sensor being of the kind having a membrane which in use is deformable in response to the value of said depression, wherein the sensor comprises resistive means having an ohmic value which varies in accordance with the force applied to said means, and an electronic control circuit controlled by said resistive means so that variations in the value of said depression applied to the membrane will vary the force applied to the resistive means and consequently will vary an output voltage of said electronic control circuit.

4 Claims, 3 Drawing Figures

U.S. Patent  Nov. 8, 1977  4,056,980
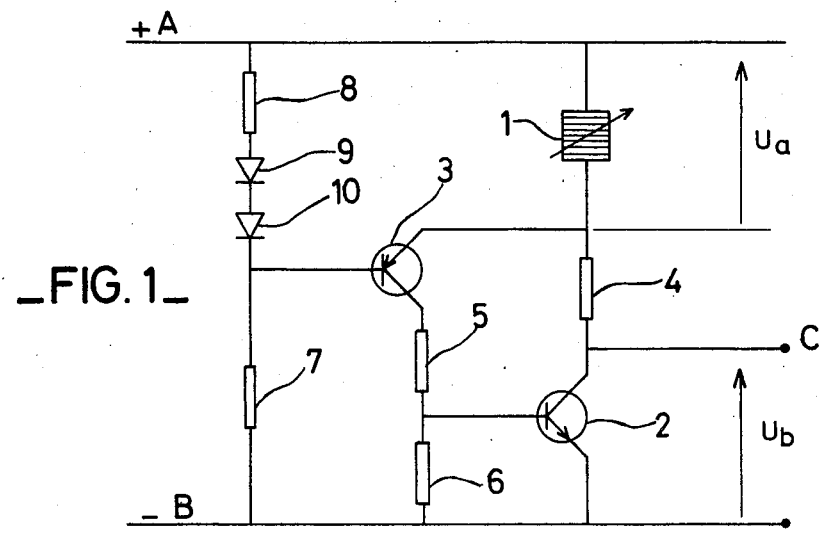
_FIG. 1_
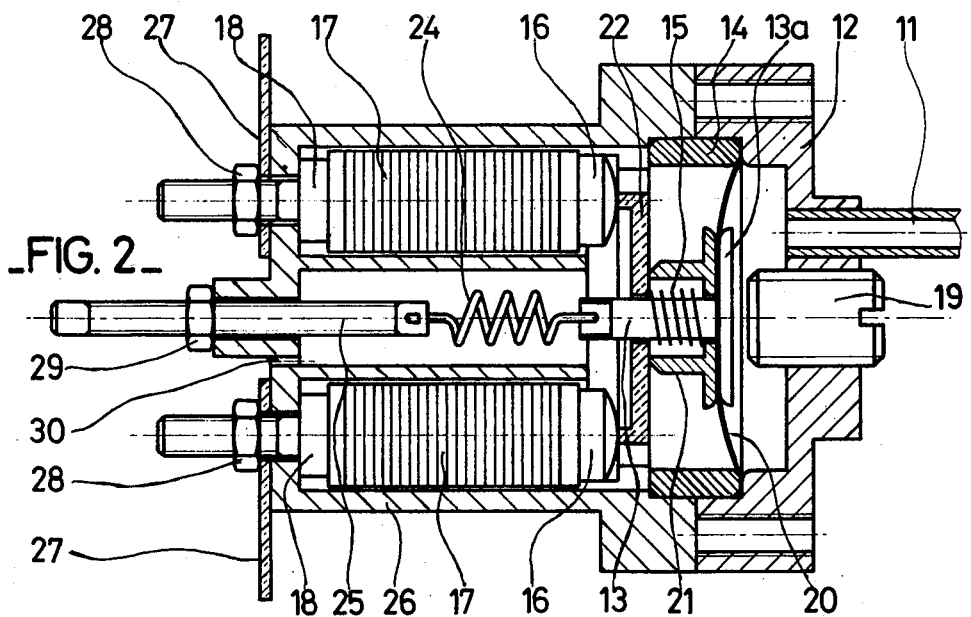
_FIG. 2_
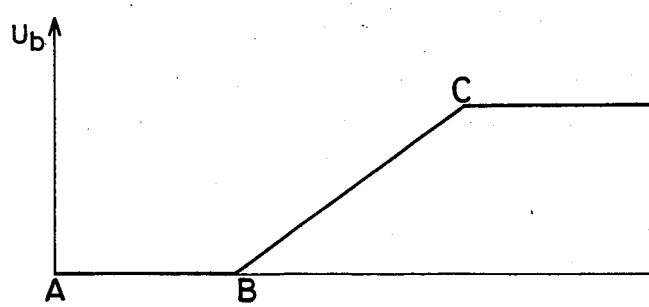
_FIG. 3_

DEPRESSION SENSOR FOR AN ELECTRONIC IGNITION ADVANCE DEVICE FOR AN INTERNAL COMBUSTION ENGINE

The present invention relates to a depression sensor for an electronic ignition advance device for an internal combustion engine, particularly for such an engine intended for use in motor vehicles.

In certain electronic ignition advance devices, the sensor for the value of the depression prevailing in the inlet manifold of the engine is in the form of a potentiometer which is constituted by a resistive track along which rubs a slide. This is a source of wear and consequently of maladjustment with respect to the initial values.

In other devices, the sensor is in the form of a stress gauge constituted by resistances of very small size, and this necessitates the use of am amplifier, although the sensor is not subject to wear.

The object of the present invention is to provide a sensor which remedies these disadvantages.

In accordance with the present invention, there is provided a depression sensor for an electronic ignition advance device for an internal combustion engine the sensor including a membrane which is deformable in response to the value of said depression, characterised in that the sensor comprises resistive means of which the ohmic value varies as a function of the value of a force which is applied to them, and an electronic control circuit controlled by the said resistive means so that variations in the value of said depression applied to said deformable membrane will vary said force applied to said resistive means and consequently will vary an output voltage of said electronic control circuit linearly within a determined range of depression values.

The invention will now be more particularly described with reference to the accompanying drawing wherein FIG. 1 is a circuit diagram of one example of a sensor in accordance with the invention.

FIG. 2 shows a preferred embodiment of the variable resistance which forms a part of a sensor in accordance with the invention, and FIG. 3 shows the output voltage curve of the sensor.

The sensor shown in FIG. 1 includes piles of carbon granules constituting a resistive means 1, the ohmic value of said means varying as a function of the force which is applied to the piles, a first transistor 2, of the NPN type, of which the emitter and the collector are in series with the resistive means 1 and a resistance of fixed value 4.

A second transistor 3, of the PNP type is connected by its emitter between the resistive means 1 and the fixed resistance 4. The collector of the transistor 3 is connected to the base of the transistor 2 by means of a polarisation resistance 5. The base of the transistor 2 is also connected to the negative pole of the sensor, by means of a limiting resistance 6. The base of the transistor 3 is connected to a voltage dividing and stabilising bridge constituted by resistances 7 and 8 and by diodes 9 and 10, which ensure the stabilisation of the voltage as a function of the necessary thermal compensation.

This control circuit is supplied between the points A and B by a stabilised supply incorporated in an electronic ignition computer (not shown). The output voltage Ub of the depression sensor is taken off at the point C and this voltage Ub (which varies linearly within a determined range of depression values) acts on an electronic ignition advance device (not shown) to modify the advance value of the said device as a function of the variation in the depression.

According to a preferred embodiment, shown in FIG. 2, the resistive means 1 is constituted by two piles 17 disposed parallel to one another in a housing 26 which is provided with a cover 12 fixed to the housing by any device, known per se.

In the housing 26 are formed two chambers in which are disposed the piles of carbon granules 17. These piles are each delimited at one of their ends by a terminal 18 and at the other end by an intermediate member 16.

Each terminal 18 has a threaded portion which passes through the housing 26 and an electrical connection strip 27 is fixed onto the said terminal 18 by a nut 28. At the other end of the piles 17, a first pressure distributing and electrically conducting cup member 22 bears on domed portions of the intermediate members 16, this cup member 22 ensuring that the piles 17 are placed in series.

A central orifice is provided in the cup member 22 to allow the passage of a rod 13 having a head 13a which presses a deformable membrane 20 against the head of a second cup member 21. The deformable membrane 20 is gripped at its periphery between an intermediate member 14 and the cover 12 of the housing 26.

The lower portion of the rod 13 has a hole through it in which is coupled one end of an extension spring 24, the other end of which is coupled to a threaded rod 25 which passes through the central portion of the housing 26. A nut 29 ensures that the threaded rod 25 is held and permits the setting, by adjustment of the pull of the spring 24, of the value of the initial force applied to the piles 17. A compression spring 15 disposed around the rod 13 bears on the one hand on the first cup member 22 and on the other hand at the bottom of a bore formed within the second cup member 21. A threaded abutment 19 screwed into the cover 12 ensures by screwing or unscrewing, adjustment of the maximum displacement of the membrane 20 under the action of the depression.

A tube 11 passes through the cover 12 and is connected in use to the inlet manifold of the engine, an air hole 30 being provided in the housing 26. The operation of the device is as follows:

As soon as the electronic ignition advance device is supplied with voltage, and by means of the stabilised supply of the said device, the transistor 3, polarised by the voltage divider and thermal stabilising bridge, which bridge is constituted by resistance 7 and 8, and by diodes 9 and 10, supplies at a constant voltage Ua the resistive means 1 comprising the carbon granule piles 17.

The voltage Ua being constant and the current from the emitter of the transistor 3 being negligable with respect to the current passing through the fixed resistance 4, any variation in the ohmic value of the piles 17, due to a variation in the value of the depression, causes a variation of the intensity of the current passing through the said piles and consequently a variation in the voltage at the terminals of the resistance 4, resulting in a variable output voltage Ub.

In the embodiment shown in FIG. 2, the traction spring 24 applies a determined pressure to the piles 17 in such a manner that the ohmic value of said piles has a selected minimum value. This minimum value is obtained by adjusting the pull of the spring 24 which applies, by means of the distributing cup member 22, a force to the piles 17. This adjustment is carried out by screwing up or unscrewing the nut 29.

The diagram of FIG. 3 shows the output voltage Ub as a function of the value of the depression prevailing in the inlet manifold. The segment AB shows the output voltage Ub at low depression values, which values correspond to a low value of the ohmic value of the piles 17, resulting in a maximum voltage value at the terminals of the fixed resistance 4 and consequently a practically nil drop in voltage between the emitter and collector of the transistor 2.

When the depression reaches the predetermined value (which is a function of the required depression advance curve), the membrane 20, subjected to this depression by means of the tube 11, decreases the force applied by the spring 24 to the piles 17. The ohmic value of said piles then increases, in known manner, in a hyperbolic manner, but the current passing through the piles 17 and the fixed resistance 4 decreases in a linear manner, the voltage at the terminals of the said piles being kept constant by the electronic control circuit, of which the transistor 3 (acting as a comparator of the voltage between its base and its emitter, i.e. between the common point of the piles 17 and the resistance 4 and the common point of the diode 10 and the resistance 7) controls the transistor 2, which becomes more or less conductive so that the voltage Ua is constant. As a result the voltage Ub varies in a linear manner, as shown by the segment BC of FIG. 3.

When the value of the depression becomes such that it completely cancels out the force applied by the spring 24 to the piles 17, the spring 15 maintains a minimum force on the piles 17, and their resistance becomes a maximum to prevent a destructive electrical arc being struck between the carbon granules.

The cup member 21 no longer bears on the cup member 22, the head 13a of the rod 13 comes to bear on the corresponding face of the adjustable abutment 19 and as a result the output voltage Ub (see segment CD FIG. 3) remains constant.

It is clear that modifications may be made to a depression sensor as above described without however going beyond the scope of the invention. It is possible, for example, to replace the piles 17 by a material of a different nature, or to replace the resistance 4 by a resistance of the same nature as that of the piles 17 and subjected to a constant force, this arrangement permitting a very efficient compensation for the thermal drift. The transistors 3 and 4 can also be replaced by a differential amplifier, in order to increase the sensitivity of the device as regards the thermal compensation. It is also clear to a man skilled in the art, that such a sensor may also be used to control the injection of fuel into an internal combustion engine, in which case the sensor would be adapted to operate in response to a pressure applied to the membrane.

I claim:

1. A depression sensor for an electronic ignition advance device for an internal combustion engine, the sensor including a membrane which is deformable in response to the value of said depression, said sensor comprising resistive means of which the ohmic value varies as a function of the value of a force which is applied to them, and an electronic control circuit controlled by said resistive means, said electronic control circuit being constituted by one transistor polarized by a voltage divider and thermal stabilizing bridge connected between the positive pole and the negative pole of the sensor, and another transistor of which the collector and the emitter are in series with said resistive means and a resistance of fixed value, and of which the base is connected to another resistance which is connected by one of its ends to the collector of the first transistor and by its other end to the negative pole of the sensor, said resistive means being connected between the positive pole of the sensor and the emitter of the first transistor so as to be supplied with stabilized voltage by means of said divider and thermal stabilizing bridge, said resistance of fixed value being connected by one of its ends to the emitter of said one transistor and by its other end to the collector of said other transistor so as to cause said output voltage from the sensor to vary linearly, whereby variations in the value of said depression applied to said deformable membrane will vary said force applied to said resistive means and consequently will vary an output voltage of said electronic control circuit linearly with a determined range of depression values.

2. A depression sensor according to claim 1, wherein the resistive means are constituted by two piles of carbon granules, which piles are disposed within a housing and arranged parallel to one another, there being also provided a first cup member which bears on the free ends of said piles to distribute force applied by said first cup member to these piles, and a second cup member rigidly connected to the deformable membrane, which second cup member bears on the first cup member in such a way that when the membrane deforms under the action of an increase in the value of the depression, the force applied by the first cup member to the piles decreases and consequently their ohmic value increases.

3. A depression sensor according to claim 2, wherein a traction spring is fixed by one of its ends to a first rod which extends through said two cup members and which has a head bearing on the second cup member, said spring being connected by its other end to a second rod which is adjustably connected to said housing so as to permit adjustment of the tension of said spring and thereby the value of the initial pressure applied to said carbon granule piles.

4. A depression sensor according to claim 2 wherein there is provided a compression spring which bears between said first cup member and said second cup member to define a minimum force on the piles of carbon granules.

* * * * *